United States Patent
Hughes

(10) Patent No.: US 6,539,069 B1
(45) Date of Patent: Mar. 25, 2003

(54) DYNAMIC FILTERING OF PILOT ENERGY SAMPLES IN A WIRELESS COMMUNICATION SYSTEM

(75) Inventor: Robbin D. Hughes, San Diego, CA (US)

(73) Assignee: Qualcomm, Inc., San Diego, CA (US)

( * ) Notice: Subject to any disclaimer, the term of this patent is extended or adjusted under 35 U.S.C. 154(b) by 0 days.

(21) Appl. No.: 08/872,111

(22) Filed: Jun. 10, 1997

(51) Int. Cl.$^7$ .......................... H04B 1/06; H04B 15/00; H04L 27/06
(52) U.S. Cl. ...................... 375/350; 375/145; 375/343
(58) Field of Search ................................. 325/206, 200, 325/142, 143, 144, 145, 137, 343, 350; 370/441, 515, 320, 324, 335, 342, 203

(56) References Cited

U.S. PATENT DOCUMENTS

| | | | | |
|---|---|---|---|---|
| 5,056,109 A | * | 10/1991 | Gilhousen et al. | |
| 5,490,165 A | * | 2/1996 | Blakeney, II et al. | |
| 5,506,865 A | * | 4/1996 | Weaver, Jr. | |
| 5,719,898 A | * | 2/1998 | Davidovici et al. | ......... 375/200 |

\* cited by examiner

*Primary Examiner*—William Luther
(74) *Attorney, Agent, or Firm*—Philip Wadsworth; Charles D. Brown; Bruce W. Greenhalls

(57) ABSTRACT

A method and apparatus for dynamically varying the response of a digital filter in a pilot signal detection circuit in response to the number of pilots that are scheduled to be searched. The apparatus comprises a searcher subsystem for generating a pilot energy sample. The pilot energy sample is then digitally filtered in a filter whose coefficients are determined in response to the number of pilots that are scheduled to be searched. A control processor determines the number of pilot signals to be searched, and calculates a filter length in response to the number of pilot signals to be searched. Furthermore, the control processor filters the pilot energy sample according to filter coefficients which are based on the calculated filter length.

8 Claims, 4 Drawing Sheets

DYNAMIC FILTERING OF PILOT ENERGY SAMPLES IN A WIRELESS COMMUNICATION SYSTEM

BACKGROUND OF THE INVENTION

I. Related Applications

The present application is related to a co-pending U.S. patent application entitled "PILOT SIGNAL DETECTION FILTER FOR A WIRELESS COMMUNICATION DEVICE", filed on even date herewith, and assigned to the assignee of the present invention.

II. Field of the Invention

The present invention relates to wireless communication systems. More particularly, the present invention relates to a novel and improved method and apparatus for dynamically varying the response of a digital filter in a pilot signal detection circuit in response to the number of pilots that are scheduled to be searched.

III. Description of the Related Art

In the field of wireless communications, several technology-based standards exist for controlling communications between a mobile station, such as a cellular telephone, Personal Communication System (PCS) handset, or other remote subscriber communication device, and a wireless base station. These include both digital-based and analog-based standards. For example, among the digital-based cellular standards are the Telecommunications Industry Association/Electronic Industries Association (TIA/EIA) Interim Standard IS-95 series including IS-95A and IS-95B, entitled "Mobile Station—Base Station Compatibility Standard for Dual-Mode Wideband Spread Spectrum Cellular System." Similarly, among the digital-based PCS standards are the American National Standards Institute (ANSI) J-STD-008 series, entitled "Personal Station—Base Station Compatibility Requirements for 1.8 to 2.0 GHz Code Division Multiple Access (CDMA) Personal Communication Systems." Other non-CDMA based digital standards include the time-division multiple access (TDMA) based Global System for Mobile Communications (GSM), and the U.S. TDMA standard TIA/EIA IS-54 series.

The spread spectrum modulation technique of CDMA has significant advantages over other modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein.

Space or path diversity is obtained by providing multiple signal paths through simultaneous links from a mobile user through two or more cell-sites. Furthermore, path diversity may be obtained by exploiting the multipath environment through spread spectrum processing by allowing a signal arriving with different propagation delays to be received and processed separately. Examples of path diversity are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention and incorporated by reference herein.

The deleterious effects of fading can be further controlled to a certain extent in a CDMA system by controlling transmitter power. A system for cell-site and mobile unit power control is disclosed in U.S. Pat. No. 5,056,109, issued Oct. 8, 1991, entitled "METHOD AND APPARATUS FOR CONTROLLING TRANSMISSION POWER IN A CDMA CELLULAR MOBILE TELEPHONE SYSTEM", Ser. No. 07/433,031, filed Nov. 7, 1989, also assigned to the assignee of the present invention. The use of CDMA techniques in a multiple access communication system is further disclosed in U.S. Pat. No. 5,103,459, issued Apr. 7, 1992, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein.

The aforementioned patents all describe the use of a pilot signal used for acquisition in a CDMA wireless communication system. At various times when a wireless communication device such as a cellular or PCS telephone is energized, it undertakes an acquisition procedure which includes, among other things, searching for and acquiring the pilot channel signal from a base station in the wireless communication system. For example, demodulation and acquisition of a pilot channel in a CDMA system is described in more detail in copending U.S. patent application Ser. No. 08/509,721, entitled "METHOD AND APPARATUS FOR PERFORMING SEARCH ACQUISITION IN A CDMA COMMUNICATION SYSTEM," assigned to the assignee of the present invention and incorporated herein by reference. When more than one pilot channel can be acquired by the wireless communication device, it selects the pilot channel with the strongest signal. Upon acquisition of the pilot channel, the wireless communication device is rendered capable of acquiring additional channels from the base station that are required for communication. The structure and function of these other channels is described in more detail in the above referenced U.S. Pat. No. 5,103,459 and will not be discussed in detail herein.

The base station pilot signals are divided into four sets based on their pilot signal strengths as measured at the mobile station. The first set, referred to as the Active Set, comprises base stations which are currently in communication with the mobile station. The second set, referred to as the Candidate Set, comprises base stations which have been determined to be of sufficient strength to be of use to the mobile station. Base stations are added to the candidate set when their measured pilot energy exceeds a predetermined, threshold $T_{ADD}$. The third set is Neighbor Set which is the set of base stations which are in the vicinity of the mobile station (and which are not included in the Active Set or the Candidate Set). And the fourth set is the Remaining Set which consists of all other base stations.

In an IS95-A communication system, the mobile station sends a Pilot Strength Measurement Message when it finds a pilot of sufficient strength that is not associated with any the of the Forward Traffic Channels currently being demodulated or when the strength of a pilot that is associated with one of the Forward Traffic Channels being demodulated drops below a threshold for a predetermined period of time. The mobile station sends a Pilot Strength Measurement Message following the detection of a change in the strength of a pilot under the following three conditions:

1. The strength of a Neighbor Set or Remaining Set pilot is found above the threshold $T_{ADD}$.

2. The strength of a Candidate Set pilot exceeds the strength of an Active Set pilot by more that a threshold ($T_{COMP}$).

3. The strength of a pilot in the Active Set of Candidate Set has fallen below a threshold ($T_{DROP}$) for greater than a predetermined time period.

The Pilot Strength Measurement Message identifies the base station and the measured pilot energy in decibels.

Typically, a conventional mobile station includes only a single search engine which it must use to serially search for all pilots of interest. The mobile station will typically search all of the set populations according to a predetermined schedule, spending a predetermined amount of time searching for each pilot signal. Thus, no matter how many pilots need to be searched, the single search engine must search each of them serially. It can be readily appreciated that in a complex communication system, such as an urban area where there are many base stations, the total time required to search all of the individual pilots serially may increase to an unacceptably high value. A long list of neighbor pilots to search generally corresponds to a slow response time to promote any particular pilot.

Thus, the mobile station's search engine may be so burdened by the number of pilots that it must search that it is late in detecting a relatively strong pilot that appears. In a CDMA communication system, a neighboring base station's pilot signal causes interference to the mobile station unless and until it is successfully demodulated and promoted to the active set. The large number of pilots being searched by one search engine caused the mobile station to be late in reacting to a changing communication environment.

For these reasons, there is a clear felt need for a method and apparatus for dynamically varying the response of a digital filter in a pilot signal detection circuit which is not susceptible to these excessive delays.

SUMMARY OF THE INVENTION

The present invention is a novel and improved method and apparatus for dynamically varying the response of a digital filter in a pilot signal detection circuit in response to the number of pilots that are scheduled to be searched. The apparatus comprises a searcher subsystem for generating a pilot energy sample. The pilot energy sample is then digitally filtered in a filter whose coefficients are determined in response to the number of pilots that are scheduled to be searched. A control processor determines the number of pilot signals to be searched, and calculates a filter length in response to the number of pilot signals to be searched. Furthermore, the control processor filters the pilot energy sample according to filter coefficients which are based on the calculated filter length.

In the preferred embodiment, the calculated filter length is inversely proportional to the number of pilot signals to be searched, thereby reducing the amount of time spent on each individual pilot signal. For the same reason, in the preferred embodiment, the calculated filter length is inversely proportional to a search window size used to search the pilot signals.

Once the pilot energy samples are filtered, the result is compared to a predetermined threshold. A message generator generates a pilot strength measurement message in response to the comparison. A receiver receives a response message in response to the pilot strength measurement message, and the control processor recalculates the filter length in response to the response message.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
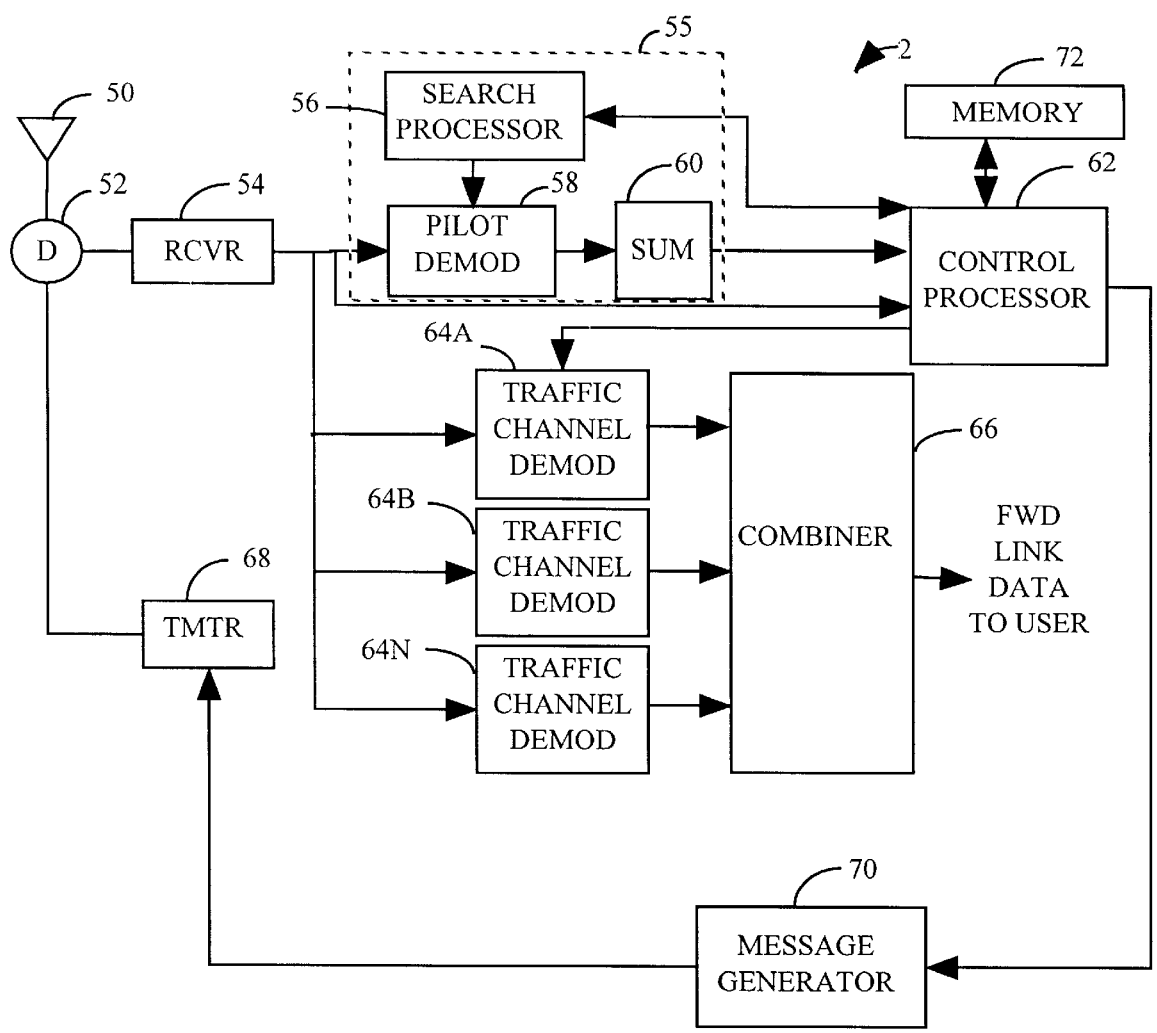
FIG. 1 is a functional block diagram of the apparatus of the present invention.

FIG. 1 illustrates mobile station 2 of the present invention. Mobile station 2 continuously or at intermittent intervals measures the strength of pilot signals of neighboring base stations. Signals received by antenna 50 of mobile station 2 are provided through duplexer 52 to receiver (RCVR) 54 which amplifies, downconverts, and filters the received signal and provides it to pilot demodulator 58 of searcher subsystem 55.

In addition, the received signal is provided to traffic demodulators 64A–64N. Traffic demodulators 64A–64N, or a subset thereof, separately demodulate signals received by mobile station 2. The demodulated signals from traffic demodulators 64A–64N are provided to combiner 66 which combines the demodulated data, which in turn provides an improved estimate of the transmitted data.

Mobile station 2 measures the strength of pilot channels. Control processor 62 provides acquisition parameters to search processor 56. Specifically, control processor 62 provides such acquisition parameters to execute the method described below with reference to FIG. 2. Control processor 62 stores the pilot signal parameters including, in the exemplary CDMA communication system, PN offset and frequency in memory 72. Control processor 62 then accesses memory 72 to determine the scheduling of pilot searches to be executed by searcher subsystem 55. Control processor 62 may be a conventional microprocessor as is known in the art. In the exemplary embodiment of a CDMA communication system, control processor 62 provides a PN offset to search processor 56 in accordance with the next pilot signal to be searched. Search processor 56 generates a PN sequence which is used by pilot demodulator 58 to demodulate the received signal. The demodulated pilot signal is provided to energy accumulator 60 which measures the energy of the demodulated pilot signal, by accumulating the energy for predetermined lengths of time as is known in the art, and providing such accumulated energy samples to control processor 62.

Figure 2A:
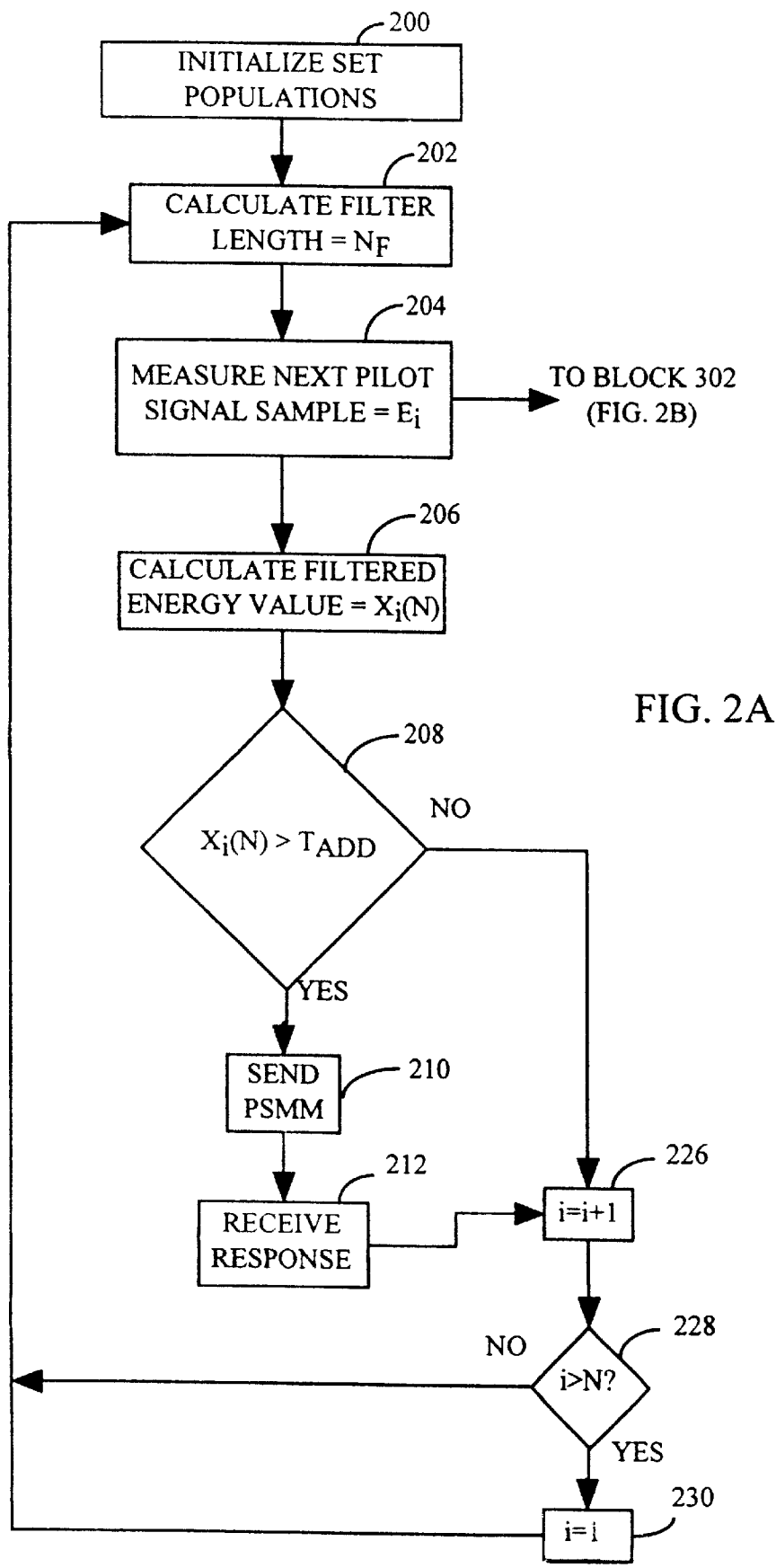
FIGS. 2A and 2B are a flowchart of the method of the present invention.
Figure 2B:
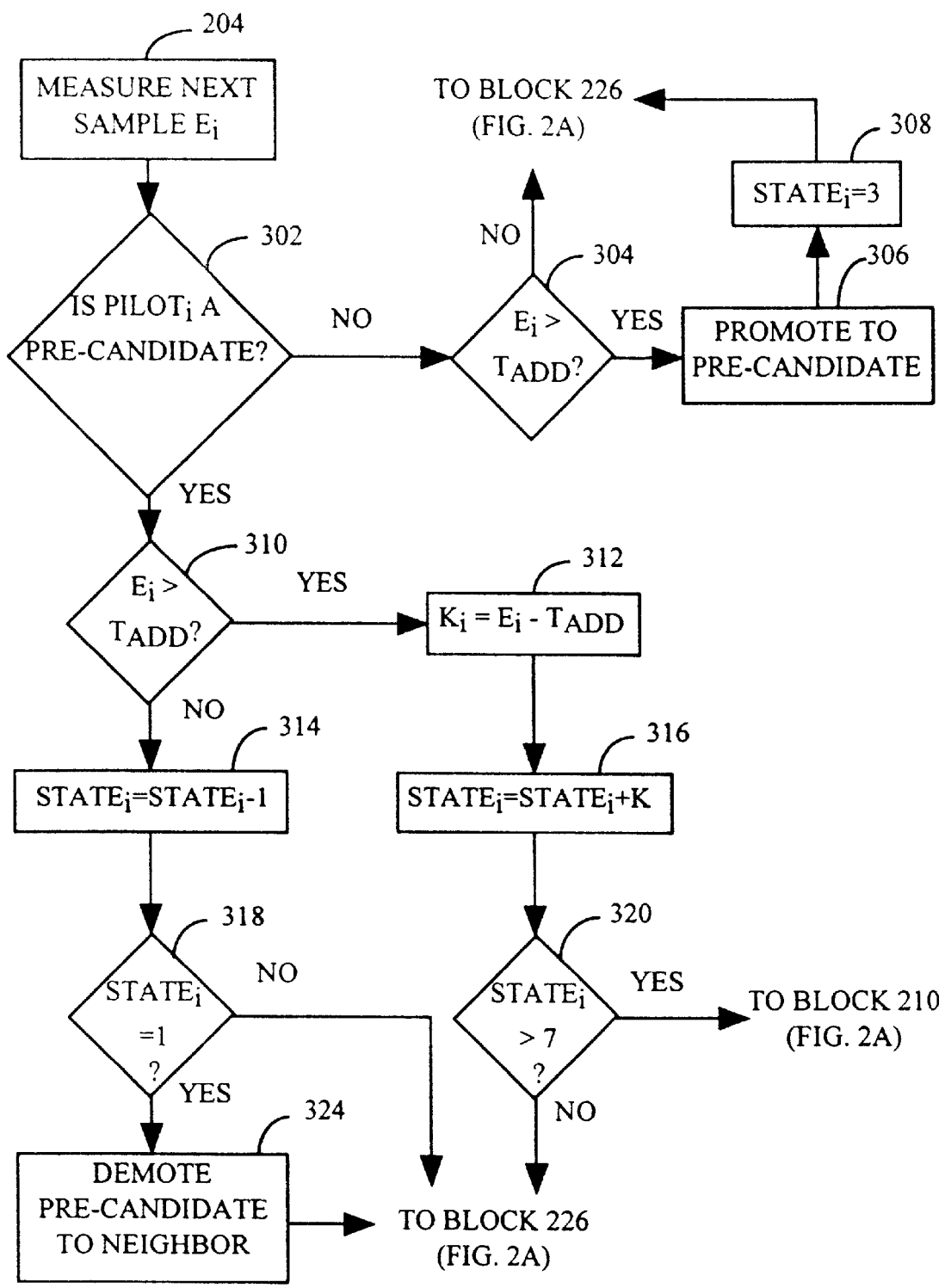
Figure 3:
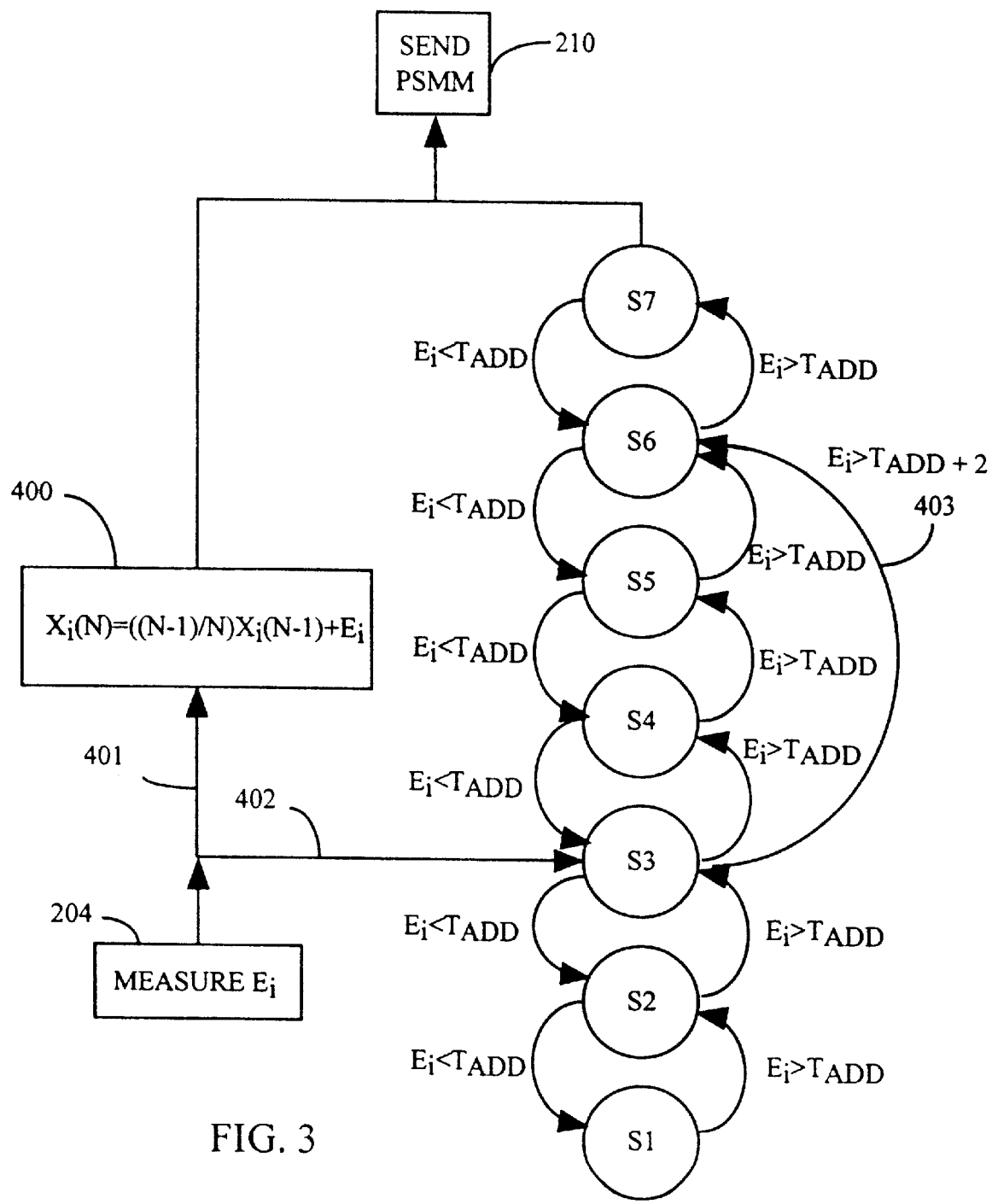
FIG. 3 is a flowchart of an alternative method of the present invention.

In the exemplary embodiment, control processor 62 digitally filters the accumulated energy samples according to the method of FIG. 2, thereby generating a filtered energy value. Control processor then compares the filtered energy value to thresholds $T_{ADD}$ and $T_{DROP}$. $T_{ADD}$ is threshold above which the received signal is of sufficient strength to effectively provide communications with mobile station 2. $T_{DROP}$ is a threshold value below which the received signal energy is insufficient to effectively provide communications with mobile station 2.

Control processor 62 provides the identities of the pilots and their corresponding measured pilot energy values to message generator 70. Message generator 70 generates a Pilot Strength Measurement Message containing the information. The Pilot Strength Measurement Message is provided to transmitter (TMTR) 68, which encodes, modulates, upconverts and amplifies the message. The message is then transmitted through duplexer 52 and antenna 50.

In the present invention, control processor 62 filters the pilot energy according to the method of FIG. 2. The process begins in block 200 where the mobile station 2 initializes the set populations of the active set, the candidate set, and the neighbor set This may include receiving a Neighbor List Message from the base station, and storing the contents of such message in memory 72. Additionally, this may include performing an initial pilot signal search upon power up when determining the strongest pilot signal corresponding to the base station with which the mobile station 2 establishes initial communication. The base stations with which the mobile station 2 has established communication are members of the active set. In any event, regardless of the manner in which the set populations are initialized at block 200, the result of block 200 is that the active set contains one or more members, the candidate set may contain zero or more members, and the neighbor set may contain zero or more members. The number of members of the active set shall be referred to herein as $N_A$. The number of members of the candidate set shall be referred to herein as $N_C$, and the number of members of the neighbor set shall be referred to herein as $N_N$.

In block 202, the control processor 62 calculates the desired filter length, $N_F$, that will make the filter time constant remain substantially fixed, regardless of the size of the set populations to be searched. The control processor calculates this filter length according to the following equation:

$$N_F = \frac{1}{W \times (N_A + N_C + N_N)}. \quad (1)$$

where W is the window size of the search window. In the exemplary CDMA system, the window size is measured in units of PN chips, as is disclosed in the above-referenced U.S. patent application Ser. No. 08/509,721.

Thus, the length of the filter is inversely proportional to the total number of members of all of the set populations. For example, if there is a large number of members of the neighbor list, and each must be searched using the same searcher resources of FIG. 1, the filter length, $N_F$, would be relatively short compared to the case where there are fewer neighboring pilots to be searched. As a consequence, even in a complex communication system in a crowded urban area where there may be on the order of tens of neighboring pilots on various frequencies to be searched, the present invention sets the filter length such that the time constant is substantially fixed, allowing more pilot signals to be searched in a timely fashion.

In block 204, a pilot energy sample, NEW_SAMPLE, corresponding to the next pilot signal to be searched, is measured in accumulator 60 and provided to control processor 62. The order in which the various members of the set populations are searched, i.e. the search schedule, may be determined by control processor 62 in a number of ways. For example, in the preferred embodiment, all of the active set pilots are first searched, and then all of the candidate set pilots, and then only one of the neighbor set pilots, followed by again searching all of the active pilots and candidate pilots. The particular search schedule is not critical to the present invention.

At block 206, the control processor 62 calculates the filtered energy value, $X_N$. In the preferred embodiment, $X_N$ is a weighted historical average according to the following equation:

$$X_N = \frac{(N-1)}{N} X_{N-1} + \frac{1}{N}(NEW\_SAMPLE) \quad (2)$$

As can be seen from Equation (2), the current filtered energy value $X_N$ weighs the previous filtered energy value, $X_{N-1}$, by more than it weighs the NEW_SAMPLE value. Thus, the digital filtering of the present invention provides smoothing of the input samples, resulting in a more stable determination of pilot signal energy than would be produced if each sample were individually considered. Additionally, the filter coefficients (i.e. the relative weights of the component samples), is determined in response to the total number of pilots in each of the active, candidate, and neighbor sets as shown in Equation (1). It should be noted that other embodiments may use less than the total number of pilots in all sets, and the present invention encompasses any implementation where the filter length is inversely proportional to the number of pilot signals in at least one of the sets. It should also be noted that any other weighted average may be used without departing from the spirit of the present invention, so long as the filter length $N_F$ is determined in response to the number of pilots to be searched. For example, in other embodiments, the previous filtered energy value $X_{N-1}$ may be weighed by less than $(N-1)/N$, and the NEW_SAMPLE by more than $1/N$.

In block 208, the filtered energy value $X_N$ is compared with the threshold $T_{ADD}$ and $T_{DROP}$ to determine whether it should be promoted or demoted, respectively into another set population. For example, if the particular pilot being measured is determined to have a filtered energy value greater than $T_{ADD}$, then it should be promoted to the active set. On the other hand, if the particular pilot being measured is determined to have a filtered energy value less than $T_{DROP}$, it should be demoted from the active set. If $X_N$ is either greater than $T_{ADD}$ or less than $T_{DROP}$, then a Pilot Strength Measurement Message (PSMM) is generated by message generator 70, and sent to the base station, proposing that the particular pilot either be promoted or demoted accordingly.

The base station sends a response message either accepting or rejecting the proposed promotion or demotion and in block 212 the mobile station 2 receives the response message. If the response indicates that the particular pilot under consideration should be promoted or demoted as proposed, then the control processor 62 recalculates the filter length $N_F$ in block 202 and the process continues. If the response indicates that the particular pilot under consideration should not be moved from one set population to another, the control processor 62 may skip block 202 and merely continue measuring the next pilot signal sample NEW_SAMPLE in block 204.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for dynamically filtering a pilot energy sample, comprising the steps of:

generating said pilot energy sample;

determining a number of pilot signals to be searched;

calculating a filter length in response to said number of pilot signals to be searched; and filtering said pilot energy sample according to filter coefficients which are based on said calculated filter length.

2. The method of claim 1 wherein said calculated filter length is inversely proportional to said number of pilot signals to be searched.

3. The method of claim 2 wherein said calculated filter length is inversely proportional to a search window size used to search said pilot signals.

4. The method of claim 2 further comprising the steps of:

comparing said filtered pilot energy sample to a predetermined threshold;

generating a pilot strength measurement message in response to said comparing step;

receiving a response message in response to said pilot strength measurement message; and recalculating said filter length in response to said response message.

5. An apparatus for dynamically filtering a pilot energy sample in a wireless communication device, the apparatus comprising:

a searcher subsystem for generating said pilot energy sample;

a control processor for determining a number of pilot signals to be searched, said control processor calculating a filter length in response to said number of pilot signals to be searched and filtering said pilot energy sample according to filter coefficients which are based on said calculated filter length.

6. The apparatus of claim 5 wherein said calculated filter length is inversely proportional to said number of pilot signals to be searched.

7. The apparatus of claim 6 wherein said calculated filter length is inversely proportional to a search window size used to search said pilot signals.

8. The apparatus of claim 6 wherein said control processor compares said filtered pilot energy sample to a predetermined threshold, said apparatus further comprising:

a message generator for generating a pilot strength measurement message in response to said comparison; and a receiver for receiving a response message in response to said pilot strength measurement message, said control processor further for recalculating said filter length in response to said response message.

* * * * *